United States Patent
Chuang et al.

(10) Patent No.: US 8,526,549 B2
(45) Date of Patent: Sep. 3, 2013

(54) SIGNAL PROCESSING CIRCUIT AND METHOD THEREOF

(75) Inventors: Ching-Hsiang Chuang, Hsinchu Hsien (TW); Tien Hsin Ho, Hsinchu Hsien (TW); Shao Ping Hung, Hsinchu Hsien (TW); Tai-Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 334 days.

(21) Appl. No.: 12/986,873

(22) Filed: Jan. 7, 2011

(65) Prior Publication Data

US 2011/0188611 A1    Aug. 4, 2011

(30) Foreign Application Priority Data

Feb. 3, 2010    (TW) .............................. 99103239 A

(51) Int. Cl.
*H04L 27/08*    (2006.01)

(52) U.S. Cl.
USPC ........... 375/345; 375/344; 375/326; 375/340; 375/343; 455/192.2; 455/182.2; 455/234.1; 455/245.1

(58) Field of Classification Search
USPC ................. 375/345, 344, 316, 326, 340, 343; 455/232.1, 234.1, 245.1
See application file for complete search history.

(56) References Cited

U.S. PATENT DOCUMENTS 7,116,942 B2 * 10/2006 Hasegawa .................. 455/67.11
2009/0323865 A1 * 12/2009 Bradley et al. ................ 375/330

* cited by examiner

*Primary Examiner* — Phuong Phu
(74) *Attorney, Agent, or Firm* — WPAT, PC; Justin King

(57) ABSTRACT

A signal processing circuit is provided. The signal processing circuit, adjusting a received radio frequency (RF) signal according to a gain, and generating a digital signal accordingly, the signal processing circuit including a signal analysis circuit, for analyzing the digital signal to generate the gain, determining whether the received RF signal is a target signal, and generating a reference value according to the digital signal, and a baseband circuit, for performing a carrier frequency offset (CFO) compensation to the digital signal according to the reference value, wherein, the reference value is generated while the signal analysis circuit is determining whether the received RF signal is the target signal.

18 Claims, 8 Drawing Sheets

SIGNAL PROCESSING CIRCUIT AND METHOD THEREOF

CROSS REFERENCE TO RELATED PATENT APPLICATION

This patent application is based on Taiwan, R.O.C. patent application No. 099103239 filed on Feb. 3, 2010.

FIELD OF THE INVENTION

The present invention relates to a signal processing circuit and method thereof, and more particularly, to a signal processing circuit including a carrier frequency offset compensation circuit and method thereof.

BACKGROUND OF THE INVENTION

In wireless transmission, carrier frequency offset (CFO) estimation has long been a critical issue in orthogonal frequency-division multiplexing (OFDM) receivers, which have been selected as the basis for the high speed wireless local area network (WLAN) standards by the IEEE 802.11 standardization group. The packet preamble of OFDM specified by the IEEE standard consists of ten identical short OFDM symbols and two identical long symbols. These symbols can be used for the carrier frequency offset (CFO) estimation.

Please refer to FIG. 1, which is a block diagram of a signal processing circuit 10 of the prior art. The circuit 10 comprises a signal receiving circuit 120, an analog-to-digital convertor (ADC) 140, an auto-gain control circuit 160 and a baseband circuit 180. The auto gain control (AGC) circuit 160 comprises a signal detection circuit 164. The baseband circuit 180 comprises a carrier frequency offset (CFO) compensation circuit 184. Please also refer to FIG. 2, which is a flowchart of the corresponding signal processing method of the prior art.

In Step 210, the signal receiving circuit 120 receives a radio frequency (RF) signal and converts the RF signal into an analog signal, and the analog signal is then converted into a digital signal by the ADC 140. In Step 220, the AGC circuit 160 selects an initial gain, and for detecting signals of different strengths, the initial gain at the receiving end is set to the maximum. In Step 230, the AGC circuit 160 detects whether the signal is saturated. When the signal strength is small, since the default value of the gain is set to the maximum, the signal can be correctly received. When the signal strength is larger, since the default value of the gain is set to the maximum, the received signal is saturated. Once the signal is saturated, the receiving end becomes incapable of distinguishing the source of the signal, thus, the gain must be reduced gradually. The signal cannot be properly detected until the signal is no longer saturated.

If the signal is still in saturation, it proceeds to Step 240 and the AGC circuit 160 reduces the gain. The process then returns to Step 230 where the AGC circuit 160 detects again whether the signal is saturated or not. The above steps are repeated until the signal is not saturated, and the process proceeds to Step 260 where the signal detection circuit 164 detects whether the signal is the desired target signal. If the signal is not the desired target signal, the process returns to Step 210, waiting for the next receiving RF signal. If the signal is the desired target signal, the process proceeds to Step 270 to enter an RF steady state and close the AGC circuit 160 to save power. Subsequently, in Step 280, the carrier frequency offset (CFO) compensation circuit 184 detects the carrier frequency offset. In Step 290, the CFO compensation circuit 184 applies the CFO compensation. At that, the CFO compensation circuit 184 detects the CFO and performs the CFO compensation according to $$\sum_{k=1}^{N} r(t+k) \cdot r^*(t+k+N),$$

where r(t) is the receiving signal, and N is the period of the receiving signal.

FIG. 3 is a schematic diagram of the timing utilization for IEEE 802.11a/g/n wireless network specifications. For detecting signals of different strengths, the AGC circuit 160 sets the default value of the gain at the receiving end to the maximum. When the signal strength is small, since the AGC circuit 160 sets the default value of the gain to the maximum, the signal can be correctly received. However, when the energy of the signal is larger, since the AGC circuit 160 sets the default value of the gain to the maximum, the received signal is saturated. Once the signal is saturated, the receiving end becomes incapable of distinguishing the source of the signal, thus, the AGC circuit 160 must keep reducing the gain gradually. The signal cannot be properly detected until the signal is no longer saturated. The above step is time-consuming. If the energy of the signal is too large, the original time slots $t_1$ to $t_7$ for signal analysis are not enough for the auto-gain adjustment and the signal detection, so as to affect the CFO estimation by the CFO compensation circuit 184.

Therefore, there is an urgent need for a signal processing circuit and method thereof providing more time for processing the saturated signal, and demodulating the signal with the CFO correctly at the same time.

SUMMARY OF THE INVENTION

It is therefore an objective of the present invention to provide a signal processing circuit and method thereof capable of having more time for processing the saturated signal, and demodulating the signal with the CFO correctly.

The invention provides a signal processing circuit, adjusting a received radio frequency (RF) signal according to a gain, and generating a digital signal accordingly, the signal processing circuit including a signal analysis circuit, for analyzing the digital signal to generate the gain, determining whether the received RF signal is a target signal, and generating a reference value according to the digital signal, and a baseband circuit, for performing a carrier frequency offset (CFO) compensation to the digital signal according to the reference value, wherein, the reference value is generated while the signal analysis circuit is determining whether the received RF signal is the target signal.

The invention further provides a signal processing method, adjusting a received radio frequency (RF) signal according to a gain, and generating a digital signal accordingly, the method comprising analyzing the digital signal to generating the gain, determining whether the received RF signal is a target signal, generating a reference value according to the digital signal, and performing the CFO compensation to the digital signal according to the reference value, wherein, the reference value is generated while the signal analysis circuit is determining whether the RF signal is the target signal.

The present invention discloses a signal processing circuit and method thereof capable of providing more time for processing the saturated signal, and therefore capable of demodulating the signal with the CFO correctly, which retrenches the time for the CFO estimation, provides more time to process the saturate signal, and is capable of demodulating the signal with the CFO compensation correctly. Furthermore, since the deviation of the CFO with the cheaper oscillator is larger, the invention can also reduce the production cost.

BRIEF DESCRIPTION OF THE DRAWINGS

The present invention will become more readily apparent to those skilled in the art after reviewing the following detailed description and accompanying drawings, in which.

DETAILED DESCRIPTION OF THE PREFERRED EMBODIMENT

Figure 4:
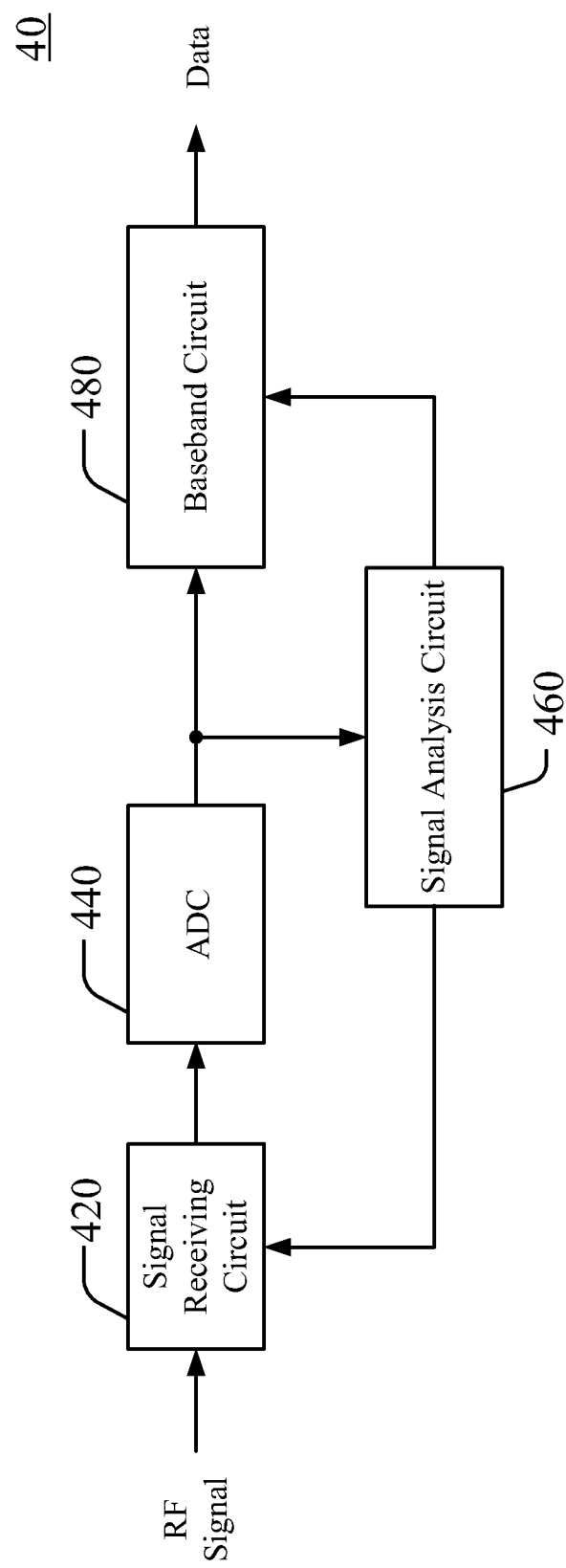
FIG. 4 is a block diagram of a signal processing circuit according to an embodiment of the present invention.
Figure 5:
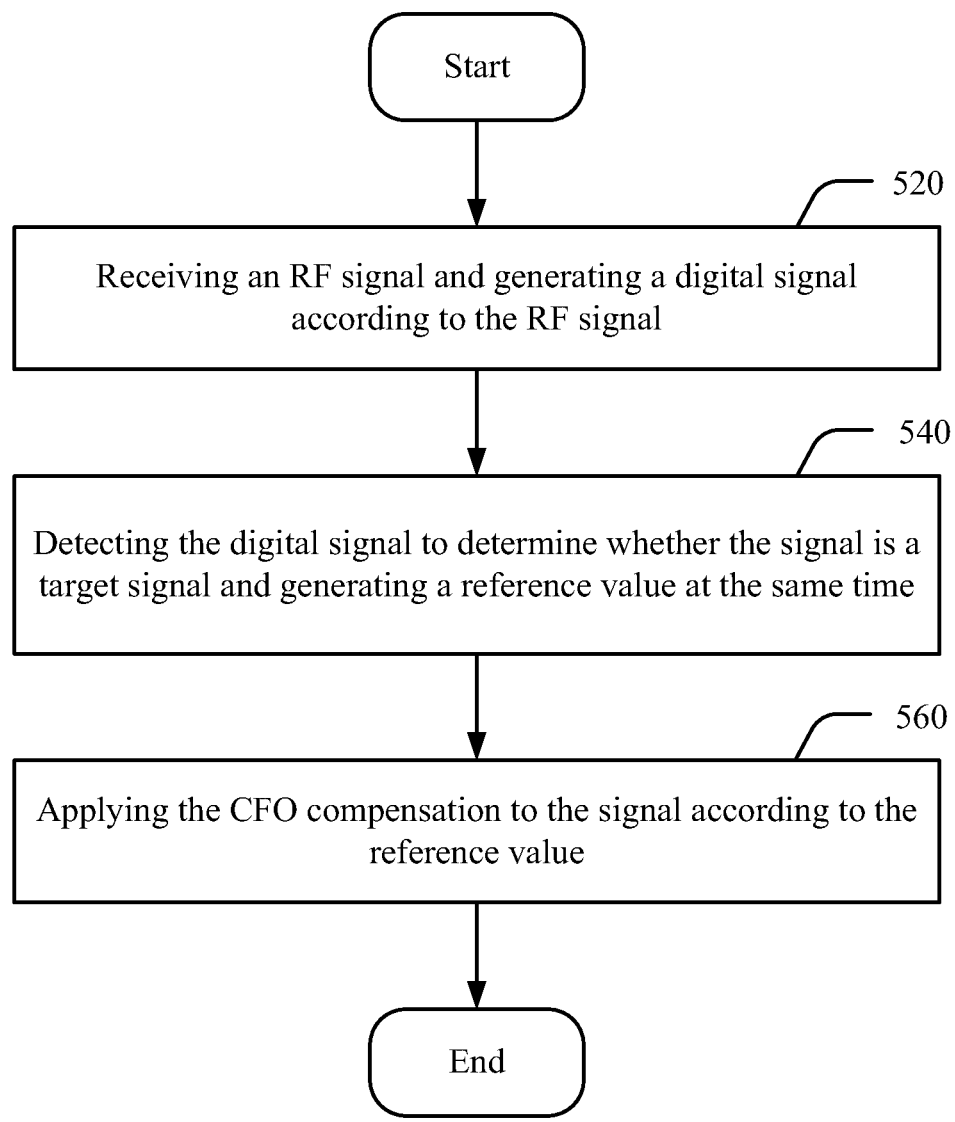
FIG. 5 is a flowchart of a corresponding signal processing method according to an embodiment of the present invention.

In order to improve the time utilization of the auto-gain adjustment, the signal detection, and the CFO estimation of the prior art, the present invention performs CFO detection and applies the CFO compensation while performing the gain adjustment and the signal detection; that is, by anticipating essential information for performing the CFO detection and applying the CFO compensation, the present invention simultaneously performing the above CFO related operations with the operations of gain adjustment and signal detection. Please refer to FIG. 4, which is a block diagram of a signal processing circuit 40 according to one embodiment of the present invention. The circuit 40 comprises a signal receiving circuit 420, an analog-to-digital convertor (ADC) 440, a signal analysis circuit 460 and a baseband circuit 480. Please also refer to FIG. 5, which is a flowchart of a corresponding signal processing method.

In Step 520, the signal receiving circuit 420 receives a radio frequency (RF) signal, adjusts the RF signal according to a gain generated by the signal analysis circuit 460 and converts the RF signal to an analog signal. Then, the analog signal is converted to a digital signal r(t) by the ADC 440. The signal analysis circuit 460 generates a gain to adjust the RF signal according to the digital signal r(t). Furthermore, if the digital signal cannot be analyzed, which means the received signal is still in saturation, the signal analysis circuit 460 must keep reducing the gain until the digital signal r(t) can be analyzed. Operations of Step 520 are similar to that of Steps 210-240, and therefore are abridged herein.

In Step 540, the signal analysis circuit 460 detects the signal r(t) to determine whether the signal is the target signal to be received by the system according to the equation $$\frac{\sum_{k=1}^{N} r(t+k) \cdot r^*(t+k+N)}{\sum_{k=1}^{N} |r(t+k+N)|^2},$$ (Eq. 1)

where N is the period of the signal r(t). A reference value is also generated at the same time according to the numerator $$\sum_{k=1}^{N} r(t+k) \cdot r^*(t+k+N)$$

of the above equation, which is generally designed for the Coarse CFO.

The CFO can be divided into an integer part, which is a multiple of the subcarrier spacing, and a fractional part, which is less than one half of the subcarrier spacing. In the literature, estimation algorithm for estimating the fractional part is called fine CFO estimation, and the estimation of the integer part is called Coarse CFO estimation. The reference value can be a complex value $$\sum_{k=1}^{N} r(t+k) \cdot r^*(t+k+N)$$

or a phase calculated according to the complex value.

While the signal analysis circuit 460 is determining whether the signal is the target signal to be received by the system, meanwhile, the above reference value, i.e. the complex value represented by the numerator, or the phase further calculated according to the complex value, is transferred to the baseband circuit 480. Since the reference value is necessary for the baseband circuit 480 to detect the CFO and apply the CFO compensation, if the calculated reference value is transferred to the baseband circuit 480 at the time that the signal analysis circuit 460 is determining whether the receiving signal is the target signal, the repetitive calculation of the reference value by the baseband circuit 480 can be avoided, so as to retrench the time for detecting the CFO and applying the CFO compensation by the baseband circuit 480. Hence, the signal processing circuit 40 has more time for adjusting the gain.

In Step 560, the baseband circuit 480 applies the CFO compensation to the signal according to the reference value. The baseband circuit 480 may calculate a phase according to the reference value $$\sum_{k=1}^{N} r(t+k) \cdot r^*(t+k+N)$$

and men apply the CFO compensation to the signal according to the phase. Otherwise, if the reference value transferred to the baseband circuit 480 by the signal analysis circuit 460 is already the phase, the baseband circuit 480 can skip the step of converting $$\sum_{k=1}^{N} r(t+k) \cdot r^*(t+k+N)$$

to the phase and applies the CFO compensation according to the phase.

Please note that the signal analysis circuit 460 and the baseband circuit 480 are general terms of the combination of elements and circuits for detecting the digital signal to determine whether the signal is a target signal and generating a reference value at the same time, and for applying the CFO compensation to the signal according to the reference value. The details vary according to the application and system realizations, and the deviated variations or modifications are all within the scope of the present invention. The detail of the operations of the signal analysis circuit 460 and the baseband circuit 480 according to two specific embodiments are as follows.

Figure 6:
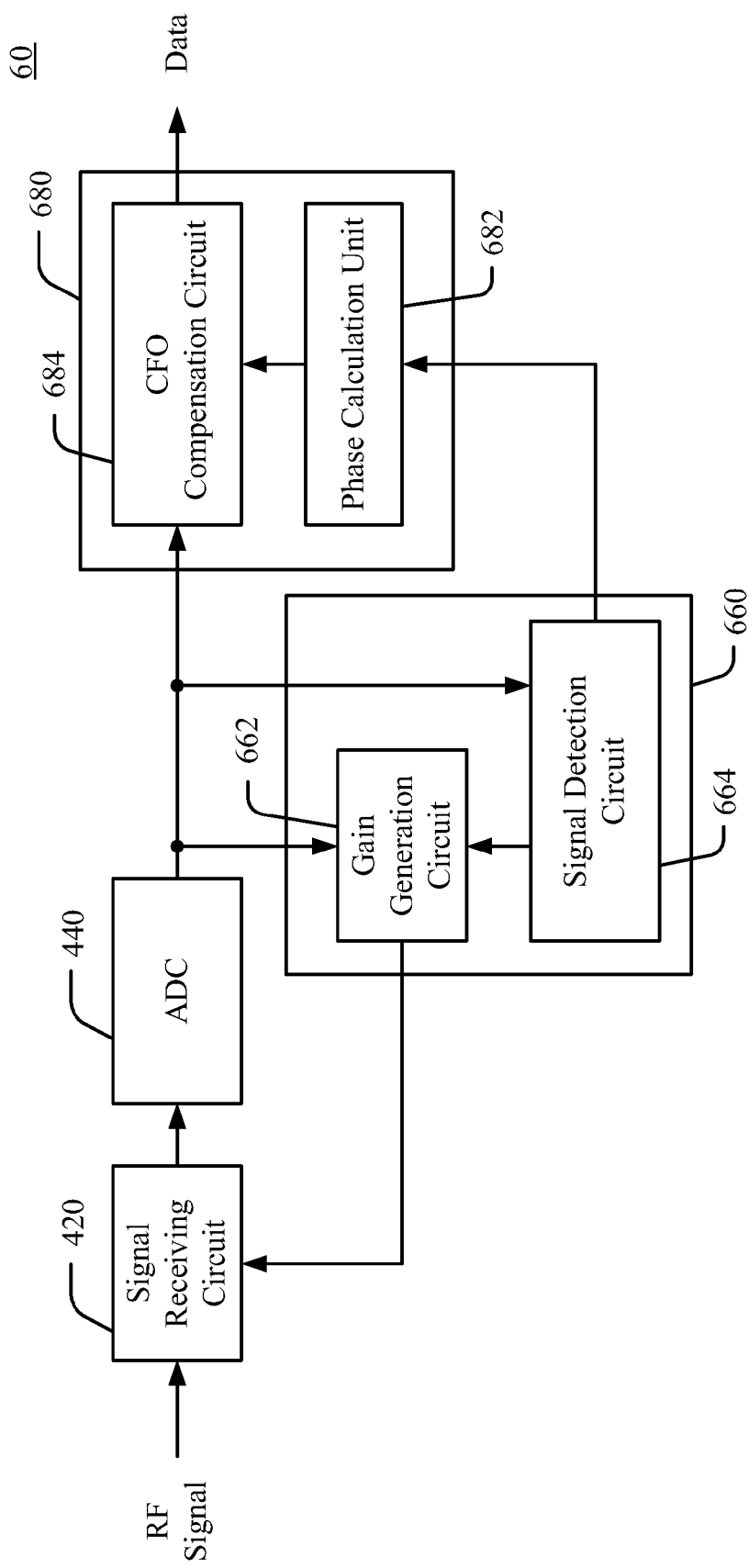
FIG. 6 is a detailed block diagram of a signal processing circuit according to a first preferred embodiment of the present invention.
Figure 8:
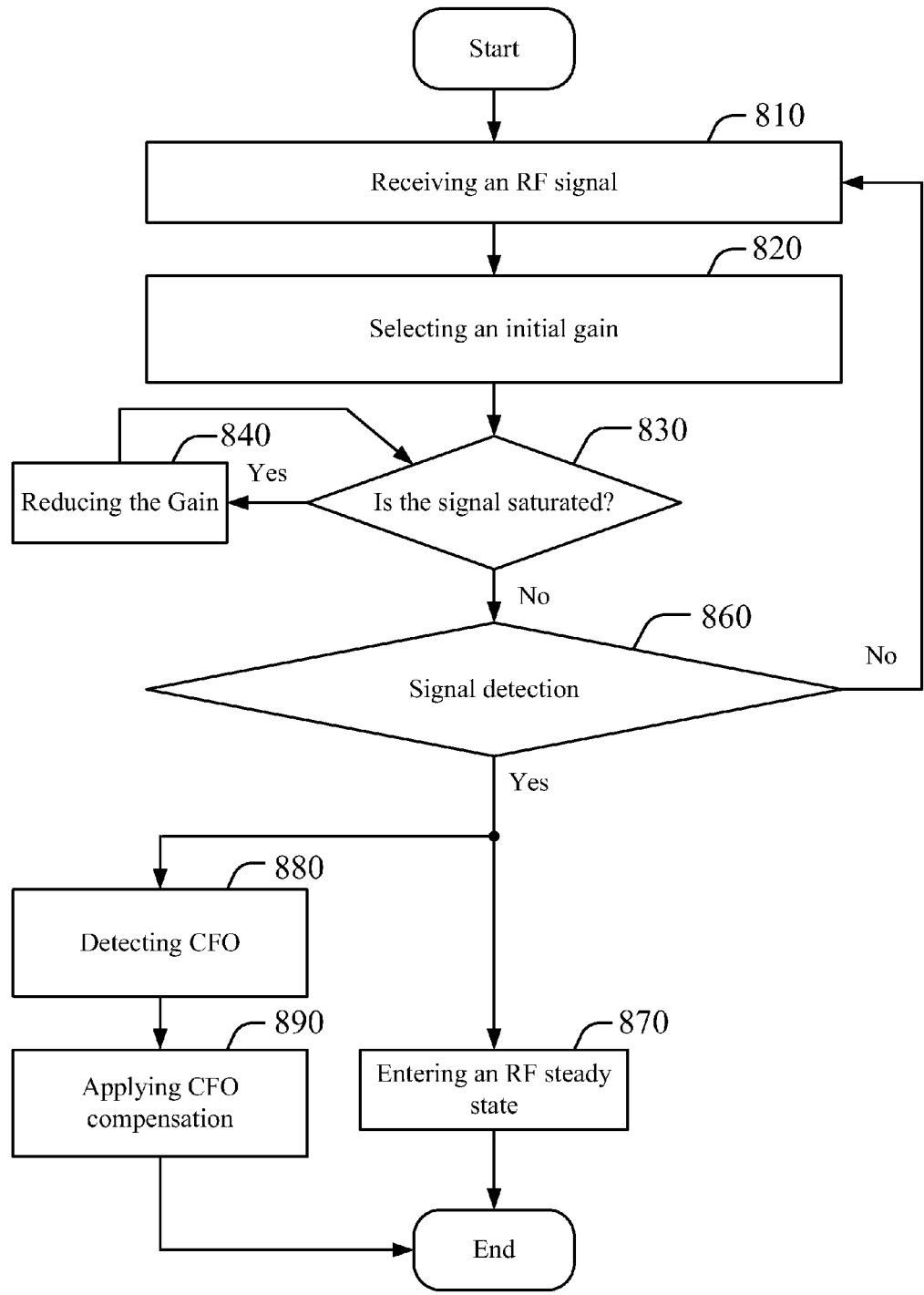
FIG. 8 is a flowchart of a corresponding signal processing method according to another embodiment of the present invention.

Please refer to FIG. 6, which is a detailed block diagram of a signal processing circuit 60 according to a first preferred embodiment of the present invention. The circuit 60 comprises the signal receiving circuit 420, the ADC 440, a signal analysis circuit 660 and a baseband circuit 680. The signal analysis circuit 660 comprises a gain generation circuit 662 and a signal detection circuit 664. The baseband circuit 680 comprises a phase calculation unit 682 and a CFO compensation circuit 684. For example, the signal analysis circuit 660 can be an AGC circuit. Please also refer to FIG. 8, which is a flowchart of a corresponding signal processing method.

In Step 810, the signal receiving circuit 420 receives an RF signal and converts the RF signal to an analog signal. The analog signal is converted to a digital signal r(t) by the ADC 440. In Step 820, the gain generation circuit 662 selects an initial gain. For detecting signals of different strengths, the gain is set to the maximum at the receiving end. In Step 830, the signal detection circuit 664 detects whether the signal is saturated. When the signal strength is small, since the default value of the gain is set to the maximum, the signal can be correctly received. When the signal strength is larger, since the default value of the gain is set to the maximum, the received signal is saturated. Once the signal is saturated, the receiving end becomes incapable of distinguishing the source of the signal, thus the gain should be reduced gradually to enable proper detection. The signal cannot be properly detected until the signal is no longer saturated.

If the digital signal r(t) cannot be analyzed, which means the received signal is still in saturation, the process proceeds to Step 840. The signal detection circuit 664 generates a determination value to indicate that the signal is saturated, and the gain generation circuit 662 reduces the gain according to the determination value. Then the process returns to Step 830. The signal detection circuit 664 detects again whether the signal is saturated.

Figure 1:
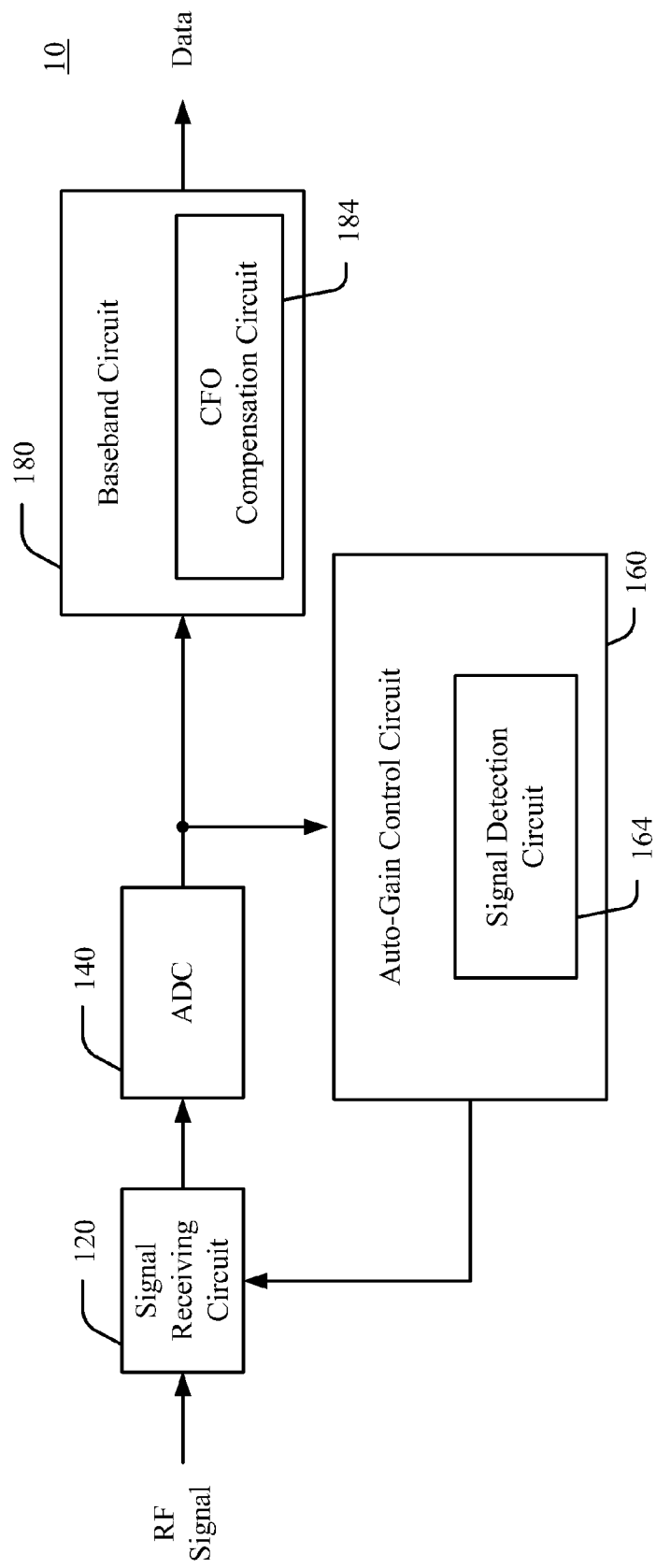
FIG. 1 is a block diagram of a signal processing circuit of the prior art.
Figure 2:
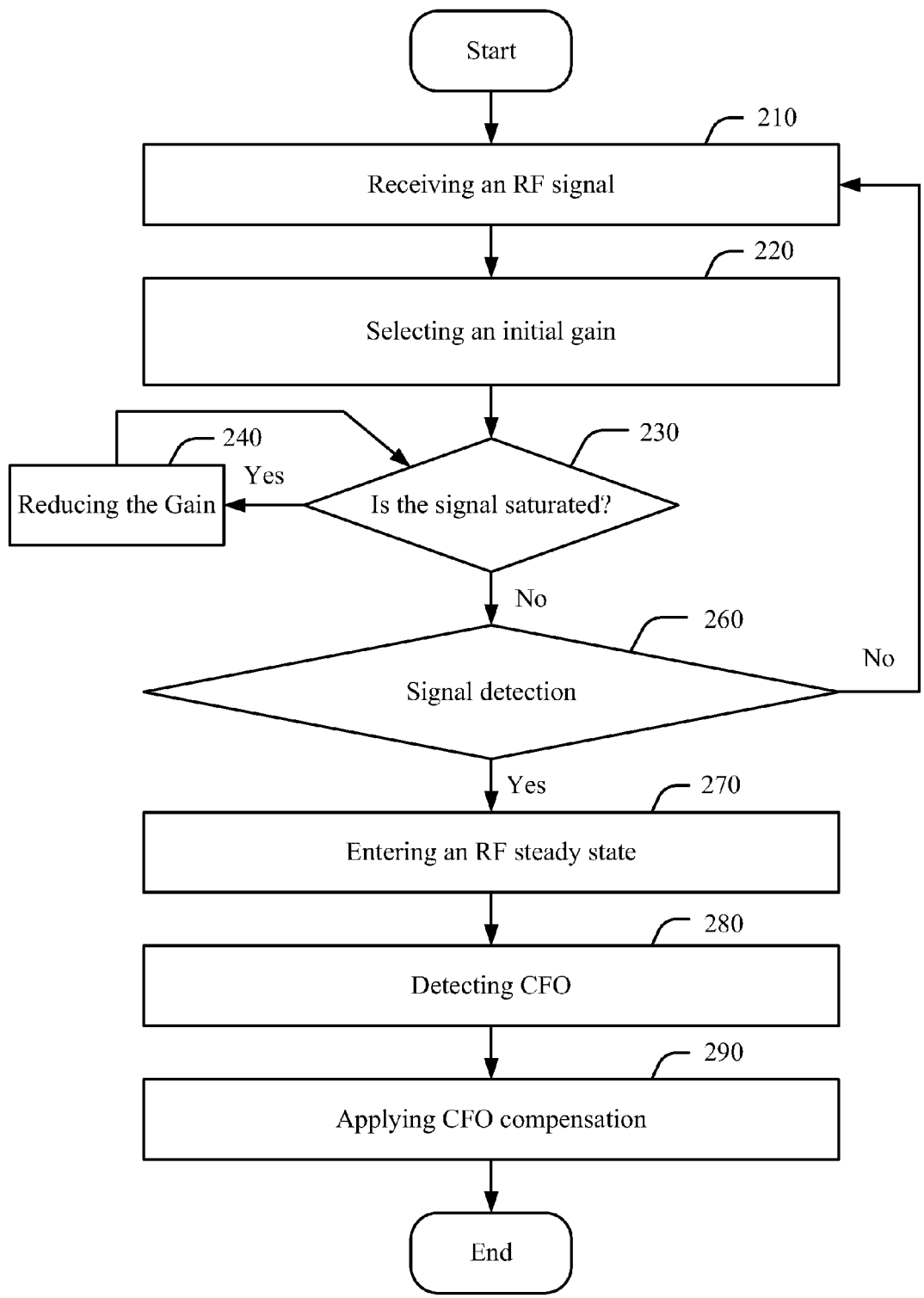
FIG. 2 is a flowchart of the corresponding signal processing method of the prior art.
Figure 3:
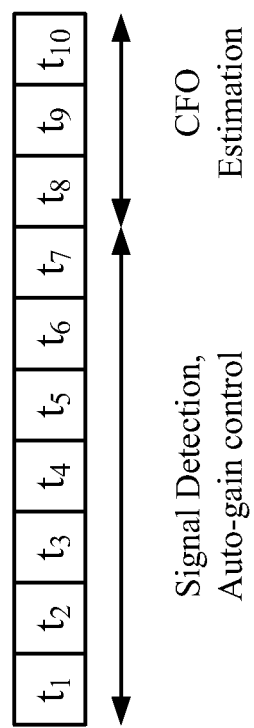
FIG. 3 is a schematic diagram of the timing utilization of IEEE 802.11a/g/n wireless network specifications.

If the digital signal r(t) can be analyzed, which means the received signal is not in saturation, the process proceeds to Step 860 for signal detection. While the signal detection circuit 664 is detecting whether the signal is the target signal to be received according to the above Eq. 1; meanwhile, the complex value $$\sum_{k=1}^{N} r(t+k) \cdot r^*(t+k+N),$$

which is the essential information for the CFO compensation circuit 684 to detect the CFO and apply the CFO compensation in Step 880 and 890, i.e. the essential information for the prior art CFO compensation circuit 184 to detect the CFO and apply the CFO compensation in FIG. 1, can be obtained.

More specifically, in this embodiment, while the signal analysis circuit 660 is determining whether the receiving signal is the target signal to be received by the system, meanwhile, the essential information for the CFO compensation circuit 684 to detect the CFO and apply the CFO compensation is generated. Consequently, the CFO compensation circuit 684 does not need additional time and resources to detect the CFO and to apply the CFO compensation after the system determines the receiving signal is the target signal to be received by the system.

The phase calculation unit 682 calculates a phase according to the complex value. The CFO compensation circuit 684 applies the CFO compensation to the digital signal according to the phase. Hence, the disadvantages of time-consuming and resource-consuming in the prior art circuit in FIG. 1, resulting from the baseband circuit 180 calculating the complex value $$\sum_{k=1}^{N} r(t+k) \cdot r^*(t+k+N)$$

again after the system has determined the receiving signal as the target signal to be received by the system, and hereafter detects the CFO and applies the CFO compensation according to the complex value, can be improved.

If the signal is not the target signal to be received, it returns to Step 810, waiting for the next receiving signal. If the signal is the target signal to be received, it proceeds to Step 870 to enter the RF steady state and may optionally close the signal analysis circuit 660 to retrench power.

Figure 7:
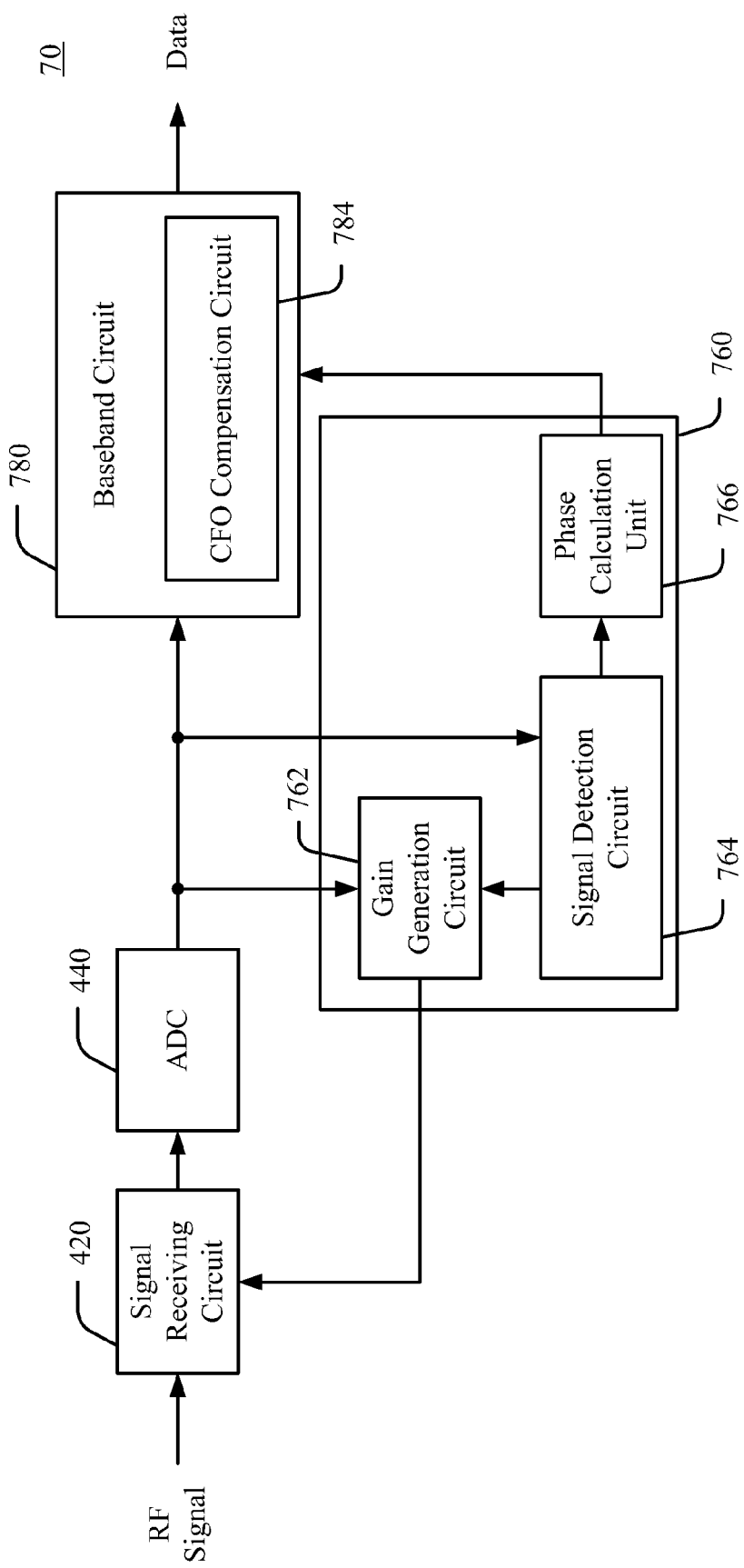
FIG. 7 is a detailed block diagram of a signal processing circuit according to a second preferred embodiment of the present invention.

FIG. 7 is a detailed block diagram of a signal processing circuit 70 according to a second preferred embodiment of the present invention. The circuit 70 comprises the signal receiving circuit 420, the ADC 440, a signal analysis circuit 760 and a baseband circuit 780. The signal analysis circuit 760 comprises a gain generation circuit 762, a signal detection circuit 764 and a phase calculation unit 766. The baseband circuit 780 comprises a CFO compensation circuit 784. For example, the signal analysis circuit 760 can be realized by an AGC circuit. Please also refer to the above FIG. 8, which is the flowchart of the signal processing method corresponding to FIG. 7. Operations of the signal receiving circuit 420, the ADC 440, and the gain generation circuit 762 in FIG. 7, together with Steps 810-840 are similar to that in FIG. 6 and are therefore omitted herein.

If the digital signal r(t) can be analyzed, which means the received signal is not in saturation, the process proceeds to Step 860. While the signal detection circuit 764 is detecting whether the signal is the target signal to be received according to the above Eq. 1; meanwhile, the complex value $$\sum_{k=1}^{N} r(t+k) \cdot r^*(t+k+N)$$

can be obtained. The phase calculation unit 766 calculates the phase according to the complex value, and the phase is the essential information for the CFO compensation circuit 784 to detect the CFO and apply the CFO compensation in Step 880 and 890. If the signal is not the target signal to be received, the process returns to Step 810, waiting for the next receiving signal. If the signal is the target signal to be received, the process proceeds to Step 870 to enter the RF steady state and may optionally close the signal analysis circuit 760 to retrench power.

Please note that, in this embodiment, although the reference number is the phase rather than the complex number, the essence of the present invention that by anticipating essential information for performing the CFO detection and applying the CFO compensation, the present invention simultaneously performing the above CFO related operations with the operations of gain adjustment and signal detection remains.

From the above, the present invention discloses a signal processing circuit and method thereof capable of providing more time for processing the saturate signal, and therefore capable of demodulating the signal with the CFO correctly, which retrenches the time for the CFO estimation, provides more time to process the saturate signal, and is capable of demodulating the signal with the CFO compensation correctly. Furthermore, since the deviation of the CFO with the cheaper oscillator is larger, the invention can also reduce the production cost.

While the present invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A signal processing circuit, adjusting a received radio frequency (RF) signal according to a gain, and generating a digital signal accordingly, the signal processing circuit comprising:
    a signal analysis circuit, for analyzing the digital signal to generate the gain, adjusting the RF signal with the gain accordingly, and determining whether the received RF signal is a target signal while simultaneously generating a reference value according to the digital signal; and
    a baseband circuit, coupled to the signal analysis circuit, for performing a carrier frequency offset (CFO) compensation to the digital signal according to the reference value;
    wherein the gain is reduced when the digital signal is in saturation;
    wherein, the reference value is a complex value or a phase calculated according to the complex value generated by a summation of the product of the digital signal and its complex conjugate over the period of the digital signal.

2. The circuit according to claim 1, wherein the signal analysis circuit comprising:
    a gain generation circuit, coupled to an analog-to-digital converter (ADC) and a signal receiving circuit, for analyzing the digital signal to generate the gain; and a signal detection circuit, coupled to the ADC, the gain generation circuit and the baseband circuit, for generating a determination value and the reference value according to the digital signal;
    wherein the gain generation circuit determines whether to adjust the prior gain to generate the gain or maintaining the prior gain as the gain according to the determination value.

3. The circuit according to claim 1, wherein the CFO is the Coarse CFO.

4. The circuit according to claim 2, wherein the reference value is a complex value.

5. The circuit according to claim 2, wherein the baseband circuit comprises:
    a phase calculation unit, coupled to the signal analysis circuit, for calculating a phase according to the reference value; and
    a CFO compensation circuit, coupled to the ADC and the phase calculation unit, for applying the CFO to the digital signal according to the phase.

6. The circuit according to claim 2, wherein the gain generation circuit is an auto-gain control (AGC) circuit.

7. The circuit according to claim 1, wherein the signal analysis circuit comprising:
    a gain generation circuit, coupled to the ADC and the signal receiving circuit, for analyzing the digital signal to generate the gain;
    a signal detection circuit, coupled to the ADC and the gain generation circuit, for generating a determination value and a complex value according to the digital signal; and
    a phase calculation unit, coupled to the signal detection circuit and the baseband circuit, for calculating the reference value according to the complex value;
    wherein the gain generation circuit determines whether to adjust the prior gain to generate the gain or to maintain the prior gain as the gain according to the determination value.

8. The circuit according to claim 7, wherein the reference value is a phase.

9. The circuit according to claim 7, the baseband circuit comprises a CFO compensation circuit, coupled to the ADC and the phase calculation unit, for applying the CFO compensation to the digital signal according to the reference value.

10. The circuit according to claim 7, wherein the gain generation circuit is an AGC circuit.

11. A signal processing method, performed by electronic circuitry configured for adjusting a received radio frequency (RF) signal according to a gain, and generating a digital signal accordingly, the method comprising:
    analyzing the digital signal to generate the gain;
    adjusting the RF signal with the gain accordingly;
    determining whether the received RF signal is a target signal; and
    simultaneously generating a reference value according to the digital signal; and
    performing a CFO compensation to the digital signal according to the reference value;
    wherein, the gain is reduced when the digital signal is in saturation;
    wherein, the reference value is a complex value or a phase calculated according to the complex value generated by a summation of the product of the digital signal and its complex conjugate over the period of the digital signal.

12. The method according to claim 11, wherein the step of analyzing a digital signal to generating a gain comprises:
    generating a determination value according to the digital signal; adjusting a prior gain or maintaining the prior gain as the gain according to the determination value.

13. The method according to claim 11, wherein the CFO is the Coarse CFO.

14. The method according to claim 11, wherein the reference value is a complex value.

15. The method according to claim 14, wherein the step of performing the CFO compensation to the digital signal according to the reference value comprises:

calculating a phase according to the reference value; and
applying the CFO compensation to the digital signal according to the phase.

16. The method according to claim 11, wherein the step of generating the reference value according to the digital signal comprises:
analyzing the signal to obtain a complex value; and calculating the complex value to obtain the reference value.

17. The method according to claim 11, wherein the reference value is a phase.

18. The method according to claim 17, wherein the step of performing the CFO compensation to the digital signal according to the reference value comprises applying the CFO compensation to the digital signal according to the phase.

* * * * *